O. M. ROW.
APPARATUS FOR USE IN CONNECTION WITH THE STRAINING, AERATING, FILTERING, AND REHEATING OF BATH WATER AND THE LIKE.
APPLICATION FILED MAR. 22, 1907.
967,244.
Patented Aug. 16, 1910.
2 SHEETS—SHEET 2.
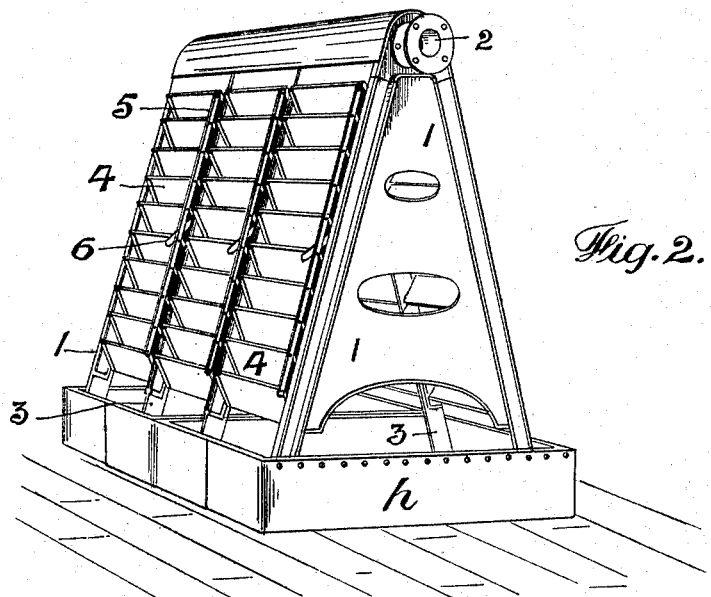
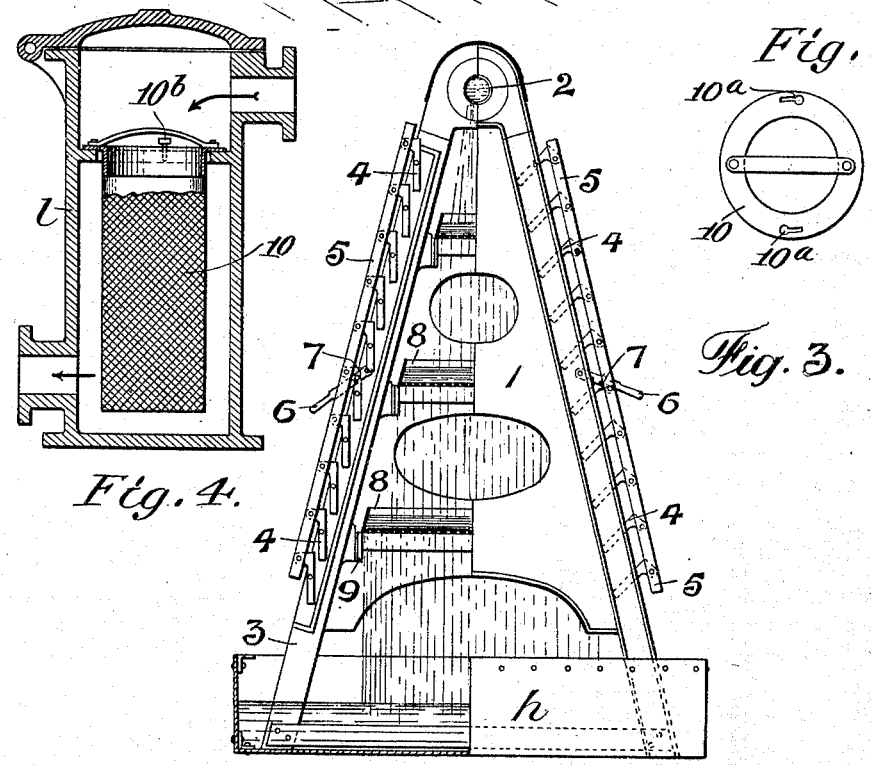
WITNESSES
John Camp
F. W. Bailey
INVENTOR.
O. M. Row
By his Attorney: Walker Gunn.

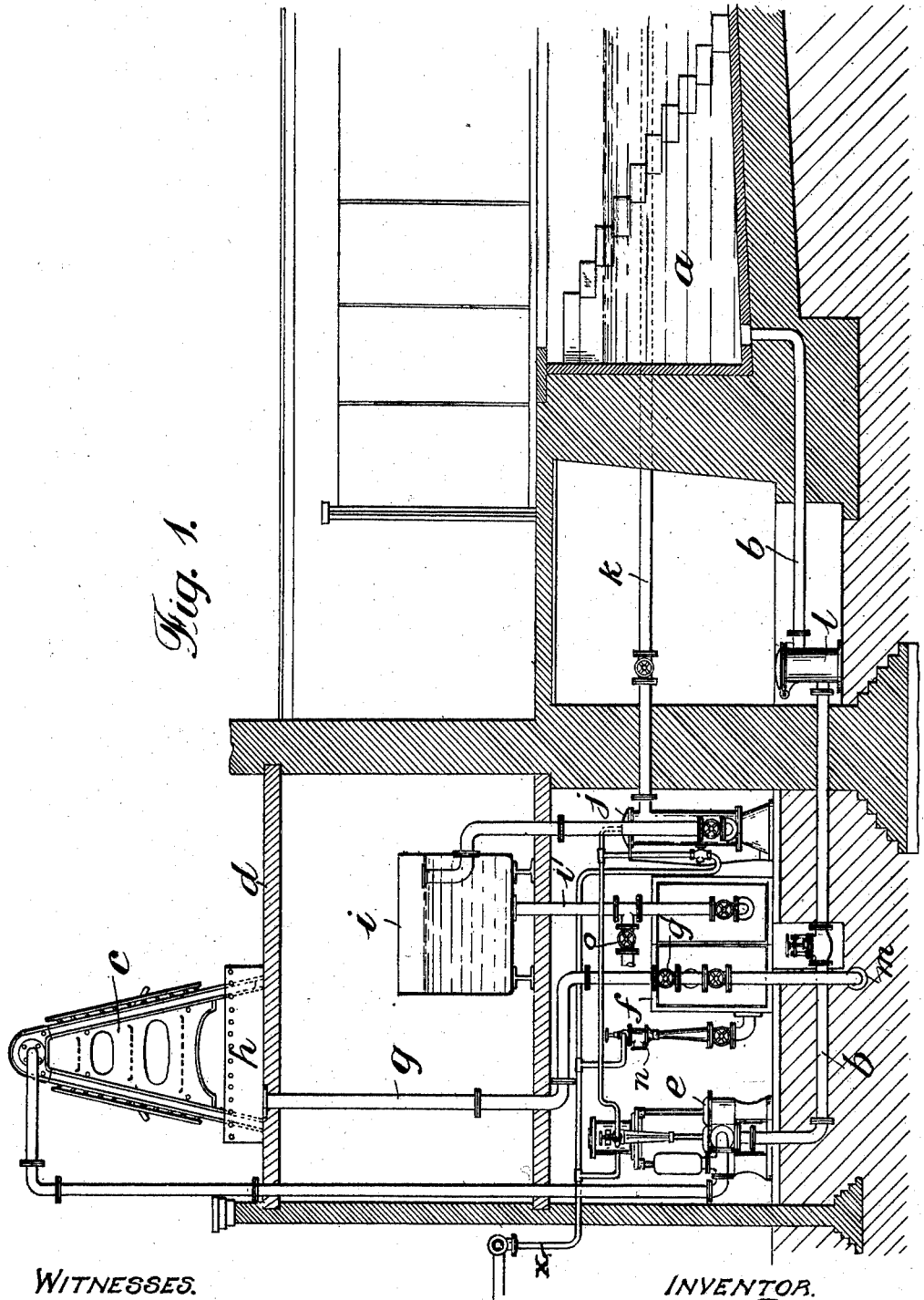

UNITED STATES PATENT OFFICE.

OLIVER MATTHEWS ROW, OF MANCHESTER, ENGLAND.

APPARATUS FOR USE IN CONNECTION WITH THE STRAINING, AERATING, FILTERING, AND REHEATING OF BATH-WATER AND THE LIKE.

967,244.      Specification of Letters Patent.     Patented Aug. 16, 1910.

Application filed March 22, 1907. Serial No. 363,947.

*To all whom it may concern:*

Be it known that I, OLIVER MATTHEWS ROW, a subject of the King of Great Britain and Ireland, and resident of Flixton, Manchester, England, have invented certain new and useful Improvements in Apparatus for the Use in Connection with the Straining, Aerating, Filtering, and Reheating of Bath-Water and the Like, of which the following is a specification.

This invention relates to and consists of an improved arrangement and combination of apparatus for use in the straining, aerating, filtering and reheating of bath water, whereby the water in say a swimming bath may after use be drawn off and made fit for reuse.

Upon the accompanying drawing, Figure 1 illustrates a complete plant for straining, aerating filtering and reheating bath water, such plant embodying the present invention. Figs. 2 and 3 illustrate to a larger scale what is called the aerating apparatus, Fig. 2 being a perspective view, and Fig. 3 an end elevation partly in section. Fig. 4 illustrates a vertical section, and Fig. 5 a plan (with the cover removed) of the strainer.

As shown in Fig. 1, $a$ is the deep end of the swimming bath, and $b$ is a pipe through which the water is drawn off when requiring to be aerated, filtered and reheated.

$c$ is the aerator, see Figs. 2 and 3, placed say on the roof $d$, and $e$ is a steam pump for drawing off the water from the bath and raising it to the aerator.

$f$ is the filter connected by pipe $g$ with the tank $h$ in which the aerator stands.

$i$ is the tank into which the water passes after leaving the filter, and in which the water is again aerated prior to passing to the reheater $j$.

$k$ is the pipe for conveying the aerated, filtered and reheated water to the shallow end of the bath.

The several pipes are fitted with valves by which the flow is controlled.

The strainer is arranged in a casing $l$ in the line of the pipe $b$, see Fig. 1.

The aerator, which forms the chief feature of the invention, consists of two plate-like ends or standards 1, preferably of inverted V formation, which at their upper ends are designed to carry the pipe 2 from which the water to be aerated is to be sprayed, and which at their lower ends, are designed to stand in the tank into which the water falls after being aerated. Between the two ends or standards 1 are two further standards (legs or struts) 3, see Fig. 2, which serve to stiffen the structure, and also to divide it into three sections. In the frame of structure thus formed, and on each side thereof and in each section, are louvers 4, each of which is mounted on its own axis and in such relation to its neighbor that when in one position the series serve to close the side of the frame, and when in another position, to open or uncover such side.

To facilitate the manipulation of the louvers in each section they are linked together by a bar 5, and for locking them in position when set to the required degree of opening, a small notched lever handle 6 and stud 7 are provided, the handle being mounted on the frame and the stud fixed to one of the louvers, see Fig. 2.

Within the structure are sheet metal trays 8, supported on cross-bearers 9 one above another, and each perforated with a large number of small holes. Those in the lowermost tray are preferably of smaller diameter than those in the upper trays.

In the pipe 2 are also a number of small holes, through which the water falls on to the uppermost tray 8, from and through which it then falls on to the middle tray, and finally on to and through the lowermost tray into the tank $h$. In thus falling first from the pipe and then from the trays in the form of a multiplicity of streams through the air, the water becomes thoroughly mixed with the air, and therefore effectually aerated or revivified. At the same time, with the louvers open and the sun-light allowed to fall upon the falling water, it is revivified to an extent which gives it almost the sparkle and clearness of fresh spring water. To get the best results, therefore, it follows that the water as it falls from tray to tray should get the maximum of air and light. To this end the aerator requires to be placed in an exposed position where light and air can get at it, and therefore, it is best to place it on the roof as shown. Certain difficulties, however, arise in thus placing the aerator. In windy weather the wind will blow the water in all directions, and prevent its falling into the trays or tank, while, if the sides of the aerator are closed, no light can reach the water. To overcome these objections use is made of the louvers, which on a fine non-windy day can be opened, and on a windy day can be closed, thus allowing of the utmost advantage being taken of the light without the water being blown away.

In Fig. 2 the louvers on the left-hand side are shown closed and those on the right-hand side opened, under which conditions the wind is supposed to be blowing from the left.

Of course, more than three trays 8 may be used, and the aerator frame may be divided into more (or less) than three sections on each side. Each section of louvers will preferably be capable of being adjusted independently of each other section although the several sections on each side may be operated simultaneously.

The strainer will usually be in the form of a drum 10 (see Fig. 4) of finely perforated metal or woven wire of close mesh, closed at one end and open at the other, and at such open end communicating with the pipe $b$. The drum will be flanged and held at its open end by bayonet slots $10^a$ engaging studs $10^b$ in the flange of the outer casing see Fig. 5, so as to be capable of being periodically removed and cleaned.

The action of the complete apparatus may be described as follows:—Foul water from the deep end of the bath $a$ is drawn off by pump $e$ through strainer 10 and delivered to the aerator $c$, via pipe $g$. It then falls through the aerator and, as before explained, is aerated. It then passes through the filter $f$ in which it is relieved of any impurities not previously arrested by the strainer. After passing through filter $f$ the water then passes up into the tank $i$ wherein, owing to the tank being open to the atmosphere, it becomes further aerated, or re-aerated. It then flows through the reheater $j$ and finally, in a condition for reuse, by pipe $k$ into the shallow end of the bath.

The bath water will preferably be in constant or frequent circulation and thus always fresh and fit for use. Besides being always fresh the water will also insure of the atmosphere of the bath building being at all times free from offensive effluvia.

To cleanse the filter $f$ the head of water in the tank $i$ may be used. That is to say, the pipe $g$ may be closed by valve $g'$ and the pipe leading to the drain $m$ opened, while air may be blown through the filter bed by opening a valve below an air injector device $n$ and also opening a valve above it to admit steam from the pipe $x$.

The heater is heated by exhaust steam from the pump cylinder and also, when desired, by live steam delivered through the pipe $x$.

The structural conditions of bath buildings varying somewhat from each other, it will be readily understood that the manner of arranging and connecting the several elements of the improved apparatus may vary without departing from the invention.

What I claim is:—

1. In apparatus for rendering bath water fit for reuse, the combination of a strainer composed of an outer metal casing and an inner perforated casing; an aerator consisting of a framework, a series of perforated trays and a perforated pipe arranged one over another in the framework and a series of adjustable louvers on two opposite sides of the aerator; a tank in which said aerator stands; a filter and a pipe connecting said tank to the inlet of the filter; an open tank and a pipe connecting the outlet of the filter with said tank; a heater and a pipe connecting said heater with the open tank; and a further pipe connecting the heater to the bath, substantially as herein set forth.

2. In apparatus for rendering bath water fit for reuse, the combination with a filter and a reheater, of an open tank between the filter and reheater, and pipes and valves whereby the inlet to the filter may be closed and the water in the tank be caused to flow through the filter and thus cleanse the same, substantially as herein set forth.

3. In apparatus of the class described, the combination with a bath, of an aerator adapted in construction and location for spraying water in the open air, means for withdrawing water from the bath and delivering it to the aerator, a filter receiving water from the aerator, means for cutting off the supply to the filter, a tank above the plane of the filter and receiving the water therefrom, means for transferring the water from the tank to the bath, and a washout, valve-controlled conduit leading from the filter; whereby the filter may be washed out by water in the tank when the valves are properly set.

4. The combination with a bath located in a building, of spraying devices exposed to the sunlight without the building, means for withdrawing water from the bath and delivering it to the spraying devices, devices for protecting the spraying devices from winds differing in direction, means for locking said protecting devices in protecting and non-protecting positions, and means for returning the treated water to the bath.

5. The combination with a bath located in a building of spraying devices located without the building in the open air, means for withdrawing water from the bath and delivering it to said spraying device, means for protecting the spray from lateral winds, and means for returning the water to the bath.

6. The combination with a bath, of a conduit leading from the bath to some distance therefrom and returning it thereto, means for forcing bath water to pass through said conduit, a sprayer and a filter interposed at different points in the conduit, and means for at will blowing air through said filter.

7. The combination with a bath, of a conduit leading to some distance therefrom and returning thereto, means for compelling the bath water to pass through said conduit, a strainer, a filter and an aerator interposed at different points in said conduit, and means for at will washing out said filter.

8. The combination with a bath, of a spraying device in position to expose its spray to free air and sunlight, adjustable means for protecting said device from lateral winds, means for withdrawing water from the bath and delivering it to said device, means for returning the water from the spraying device to the bath, and a heater arranged to supply heat to the returning water.

9. The combination with a bath and an aerator at some distance from the same, of a conduit leading from the bath to the aerator, adjustable devices for protecting the aerator from lateral winds, a conduit leading from the aerator back to the bath, means for causing bath water to pass from the bath through said conduits and aerator and back to the bath, and a strainer device in the path of the outgoing water and adapted to accumulate sediment without lessening the flow.

10. The combination with a bath and an aerator at some distance therefrom in the free air, of an adjustable louver device for protecting the aerator from winds, means for causing bath water to pass from the bath to the aerator and back to the bath, and straining devices interposed in the path of the outgoing water and comprising a casing having an upper compartment to receive the water, a lower compartment from which the water is discharged, and an upwardly open cup projecting for some distance into the lower compartment, from the upper compartment, and having straining lateral walls.

11. The combination with a bath and a spraying device at some distance therefrom in the free air, of adjustable means for protecting the spray from lateral winds, means for withdrawing water from one side of the bath near the bottom and delivering it to the spraying device, a conduit for returning the sprayed water to the opposite side of the bath, a strainer interposed in the path of the outgoing water, and filter interposed in the path of the returning water.

12. The combination with a bath, of spraying devices at some distance from the bath in the open air, means for protecting said device from wind coming from either side, means for withdrawing water from the bath and delivering it to the spraying device, a filter, below the spraying device, provided with a valved washout discharge pipe, a valved pipe leading from the spraying devices to the filter, a tank above the filter, a valved pipe leading from the filter to the lower part of the tank, and a conduit leading from the upper part of the tank to the bath; whereby the bath water may be aerated and filtered and the filter may be washed out by merely changing the positions of the valves.

13. The combination with a bath, of spraying devices at some distance therefrom in the open air, means for withdrawing water from the bath and delivering it to the spraying devices, distinct louver devices upon opposite sides of the spraying devices, and means for opening and closing adjustment of the louver devices independently.

14. The combination with a bath, of an aerator in position to receive sunlight and comprising a frame, a series of perforated trays mounted one above the other in the frame, a pipe for delivering water from the bath to the upper tray, means for forcing the water through said pipe, a receptacle below the lower tray to receive water therefrom, and a conduit leading from the receptacle to the bath.

In witness whereof I have hereunto set my hand in the presence of two witnesses.

OLIVER MATTHEWS ROW.

Witnesses:
F. C. PENNINGTON,
JOHN CAMP.